H. A. KUHN & W. W. MACFARREN.
MINING MACHINE.
APPLICATION FILED JAN. 2, 1909.

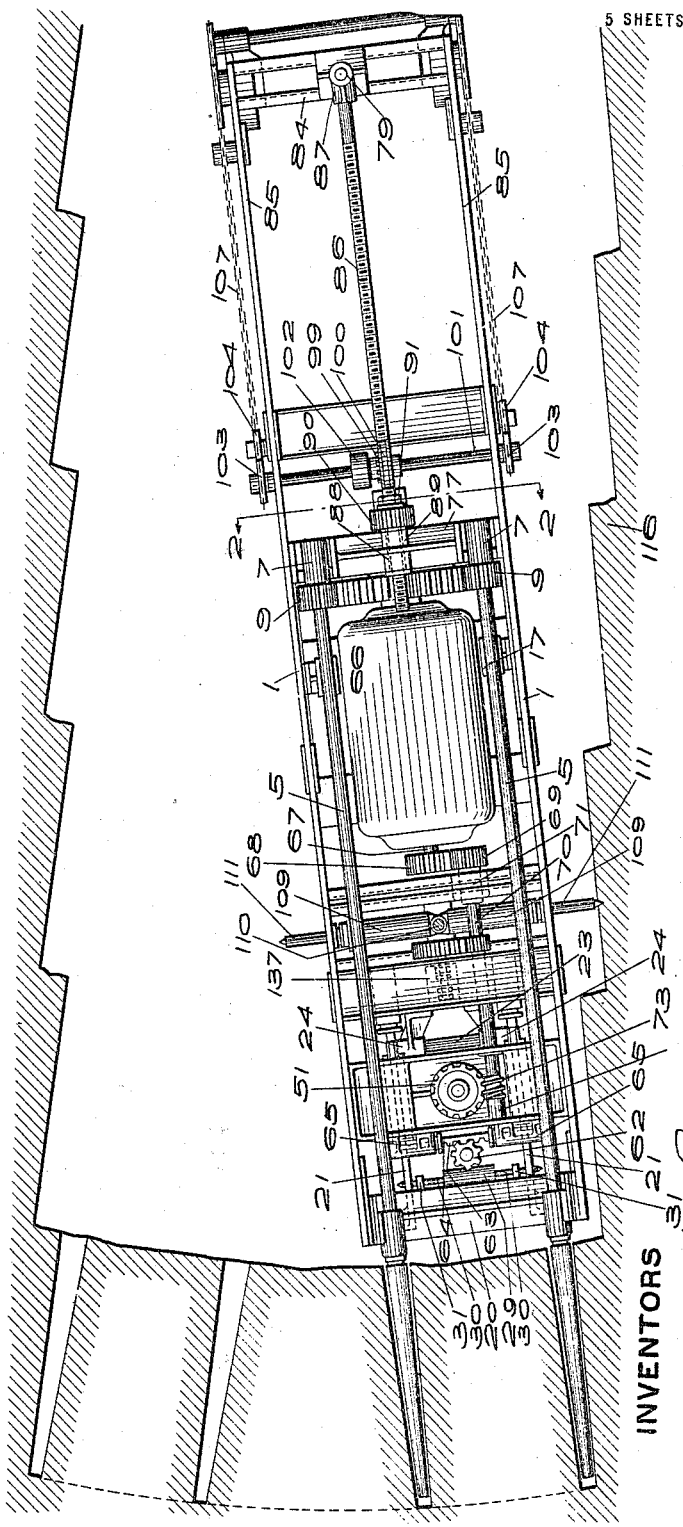

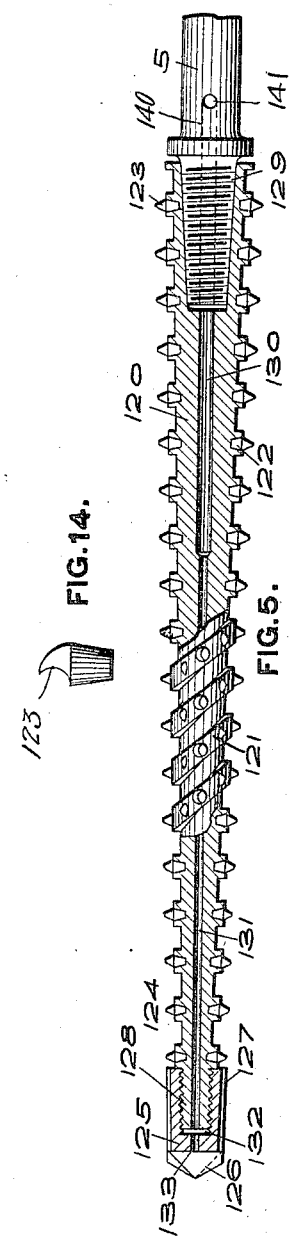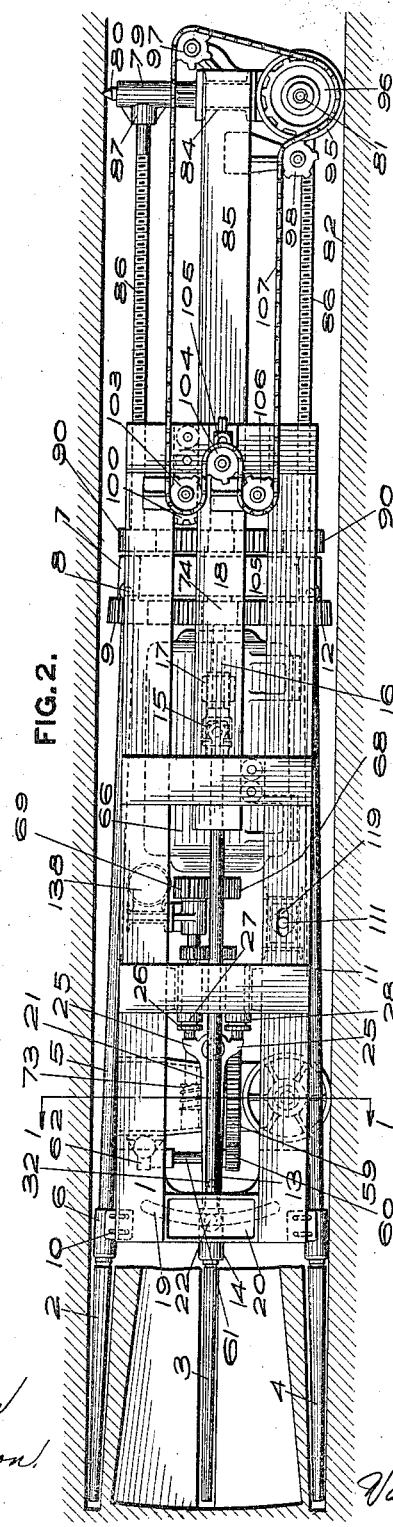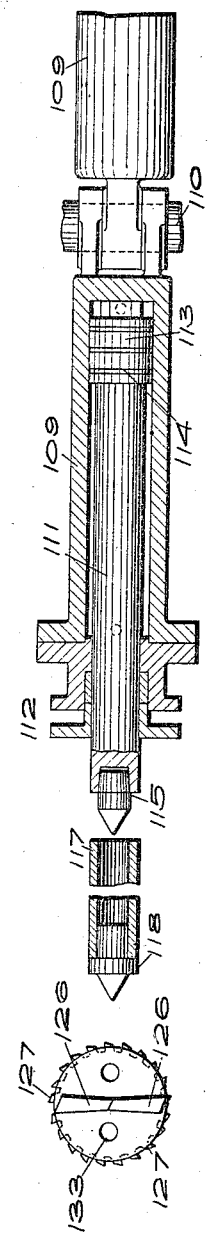

1,148,973.

Patented Aug. 3, 1915.

5 SHEETS—SHEET 3.

WITNESSES
Chas. Fosterman
Estelle M Johnson

INVENTORS
Harry A. Kuhn
Walter W. Macfarren

H. A. KUHN & W. W. MACFARREN.
MINING MACHINE.
APPLICATION FILED JAN. 2, 1909.
1,148,973.
Patented Aug. 3, 1915.
5 SHEETS—SHEET 4.
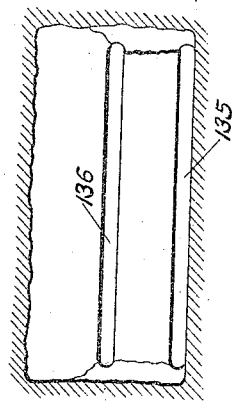
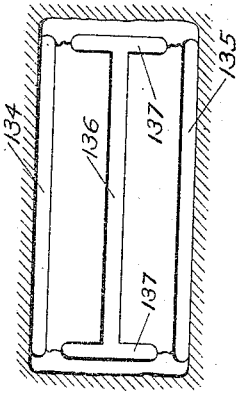
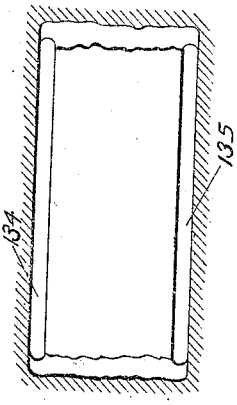
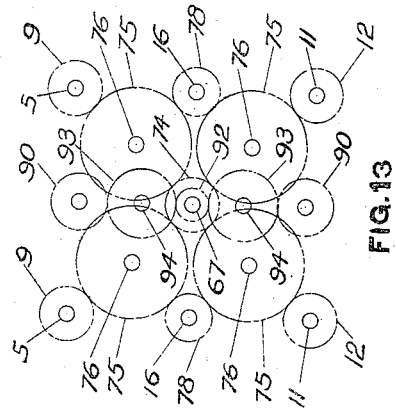
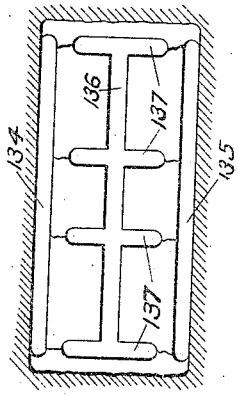
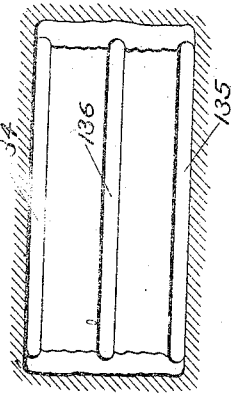
WITNESSES
INVENTORS

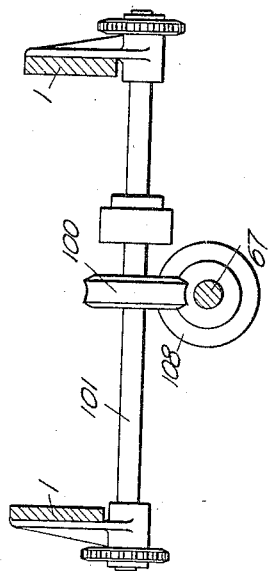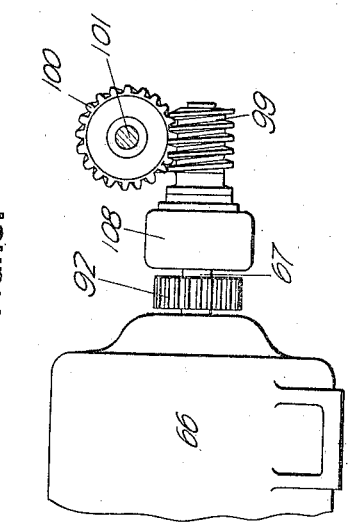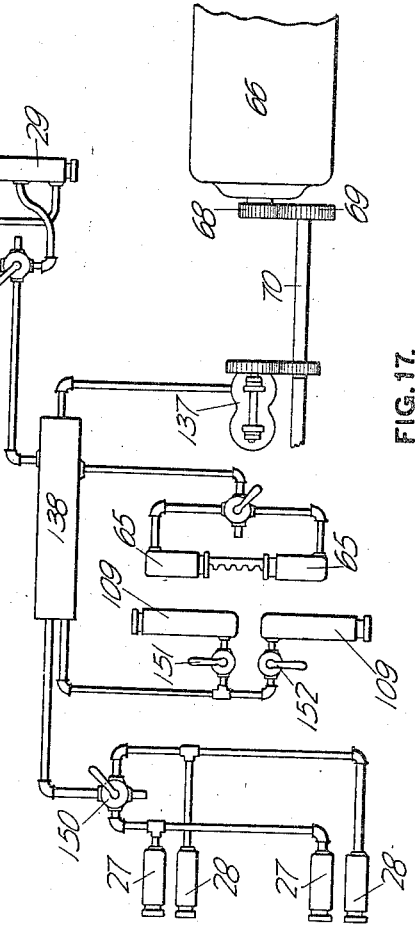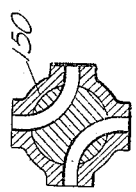

UNITED STATES PATENT OFFICE.

HARRY A. KUHN AND WALTER W. MACFARREN, OF PITTSBURGH, PENNSYLVANIA; SAID MACFARREN ASSIGNOR TO SAID KUHN.

MINING-MACHINE.

1,148,973.   Specification of Letters Patent.   Patented Aug. 3, 1915.

Application filed January 2, 1909. Serial No. 470,292.

*To all whom it may concern:*

Be it known that we, HARRY A. KUHN and WALTER W. MACFARREN, citizens of the United States, residing at Pittsburgh, in the county of Allegheny and State of Pennsylvania, have invented certain new and useful Improvements in Mining-Machines, of which the following is a specification.

The objects of our invention are to provide a machine which will mine the entire thickness of a seam of coal without the use of explosives; to provide a machine which will mine coal in rooms or entries and produce a high percentage of the coal mined in very large lumps; to provide a machine which is self-propelled and easy of transportation; one which is strong and durable, simple, easily operated, and having various other features of convenience and adaptability, which will be more specifically described hereinafter.

Figure 3:
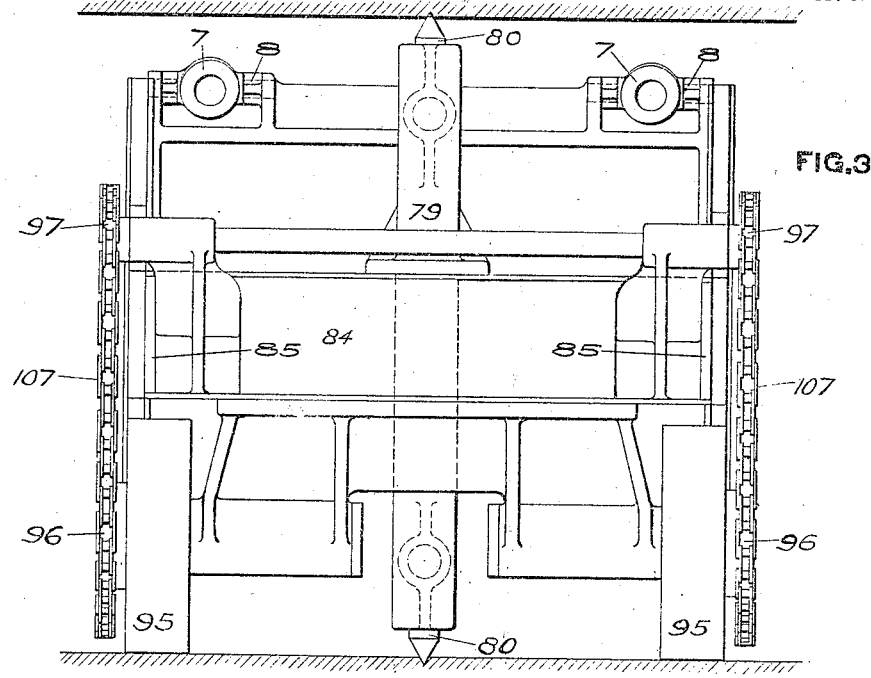
Figure 4:
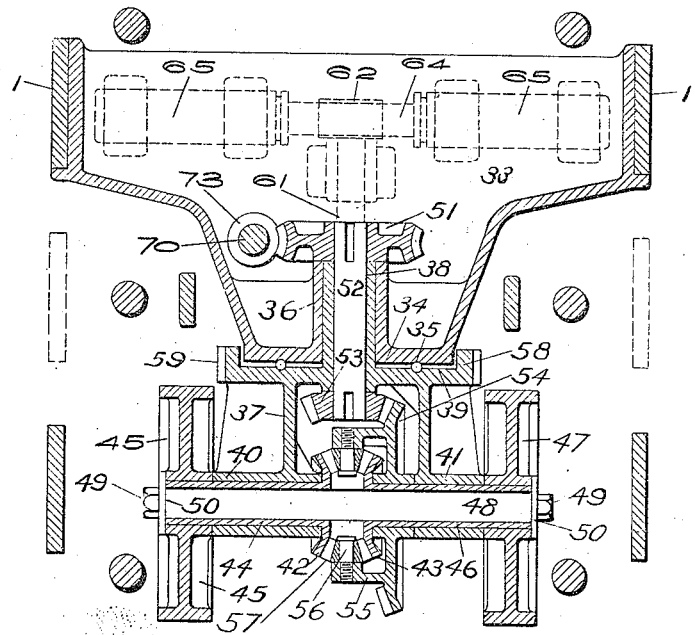

Referring to the drawings, Figure 1 is a plan view of our improved machine in working position in a room or entry. Fig. 2 is a sectional elevation through a coal seam, showing the machine in working position. Fig. 3 is a rear elevation of the machine. Fig. 4 is a sectional elevation through the front truck and its supporting and driving means, taken on the line 1—1 of Fig. 2. Fig. 5 is a combined sectional and outside view of one of the cutter bars. Fig. 6 is an end view of the front end thereof. Fig. 7 is a sectional view through one of the feeding jacks. Figs. 8, 9, 10, 11, and 12 are sectional elevations through an entry, showing the different forms of cuts which the machine is adapted to make in the coal. Fig. 13 is a diagrammatic elevation of the driving gears for the cutter bars and the feed screws, taken on the line 2—2 of Fig. 1, and Fig. 14 is a detail of an inserted cutting tooth. Fig. 15 is an elevation showing the worm drive from the motor to the cross shaft, actuating the rear truck wheels. Fig. 16 is an elevation of the same at right angles thereto. Fig. 17 is a diagram illustrating the fluid pressure connections to the various cylinders; and Fig. 18 is a sectional view of a four-way valve.

The machine consists of a frame 1, constructed of any suitable material, preferably of rolled or wrought steel. At the front end of the frame, there are mounted six cutting elements, comprising rotary bars with inserted cutting teeth and consisting of the upper bars 2, the middle bars 3, and the lower bars 4.

There are two upper bars 2, and two lower bars 4, and these four bars are of duplicate construction and interchangeable. The mounting of the upper and lower bars is also the same, and the driving means are in duplicate, so that a description of these arrangements for one bar will cover the other three.

The bar 2 is secured to an inclined shaft 5, which is supported in the front bearing 6 and the rear bearing 7. The rear bearing 7 is pivoted about a pin 8, adjacent to the driving gear 9, this latter being secured to the shaft 5. The front bearing 6 is bolted to the forward end of the frame 1, by bolts passing through the slot holes 10. The effect of this mounting is that the shaft 5 and the bar 2 may be oscillated about the center of the pin 8 to raise or lower the bar a certain amount. The lower bars 4 are secured to the ends of shaft 11 in a precisely similar manner, so that they may be vertically adjusted the same as the upper bars. The effect of raising or lowering the lower bars is to cause the machine as a whole to raise or lower itself in the seam of coal, as this adjustment changes the relation between the bottom cut and the supporting truck wheels resting on that cut. This adjustment, therefore, provides means adapted for following the contour of the coal seam.

The effect of adjusting the upper bars 2 is to change the height of the cut made by the machine so that this adjustment is adapted to meet small variations in the thickness of the coal, which are of frequent occurrence.

By reason of the inclination of the shafts 5 and 11, the driving gears 9 and 12 are kept within the cuts made by the bars 2 and 4. A further reason for the inclination of the shafts 5 and 11 is that it allows the use of a tapered cutter bar, which is naturally the strongest form, and at the same time allows the cuts made by the upper and lower of these bars to be parallel and continuous planes.

The intermediate set of cutter bars 3 is also provided for purposes hereinafter set forth. These bars are secured to the ends of shafts 13. The front ends of the shafts 13 are supported in bearings 14, and the rear ends of the same engage universal joints 15, which are secured to shafts 16 supported in bearings 17 and 18.

The bearings 14 are guided in curved slots 19 formed in the front casting 20, which is secured to the frame 1. The effect of this mounting is that shafts 13 may be oscillated in vertical planes about the center of the universal joint 15 to cause the bars 3 to cut vertical slots in the coal.

The oscillation of the bars 3 is effected by power operated mechanism as follows:— The front ends of the swinging arms 21 are pivoted to the bearings 14 by pins 22. The arms 21 are secured to a shaft 33, the same being supported in bearings 24 secured to the frame 1. The swinging arms 21 are provided at their rear ends with the projections 25, which are engaged by the plungers 26 of the fluid pressure cylinders 27 and 28, there being a pair of these latter on each side of the machine secured to the frame 1. By admitting fluid pressure to the upper cylinders 27, the cutter bar 2 will be fed downward from its normal position, and by admitting fluid pressure to the lower cylinders 28, the reverse action will take place. The above described mechanism is adapted to oscillate the cutter bars 3 in vertical planes, but as these bars 3 are also required to make horizontal cuts when the machine is swung, a locking device to hold the cutter bars 3 in a horizontal position shown in Fig. 2 is provided as follows:—A double-ended, double-acting fluid pressure cylinder 29 is secured to the front casting 20. This cylinder is provided with a pair of piston rods 30, the same extending through the lugs 31 of the casting 20, and passing through properly located holes 32 in the swinging arms 21. The piston rods 30 are provided with pointed ends to facilitate their entrance into the holes 32. When fluid pressure is equally applied to the cylinders 27 and 28 and there is no strain on the bars 3, they will assume a horizontal position as shown in Fig. 2. Now, if fluid pressure is applied to the inner ends of the double cylinder 29, the piston rod 30 will be forced outward until their ends engage the holes 32 in the swinging arms 21 and lock the same firmly in mid-position.

When it is desired to make vertical cuts with the bars 3, the controlling valve for cylinder 29 is thrown to retract the piston rods 30, which allows free vertical movement of the swinging arms 21, so that they can then be acted upon by the cylinders 27 and 28 to make vertical cuts.

The front end of the machine is supported on a truck comprising the following parts:—The casting 33 is secured to the upper parts of the frame 1. This casting 33 is provided at its lower face with a turn table 34, engaging the balls 35. Above the turn table, 34, there is formed a bearing 36. Below the turn-table 34 there is placed a swiveling axle-housing 37, provided with the trunnion 38, extending upward through the bearing 36. The turn-table 39 on the axle-housing 37 also engages the balls 35. The axle-housing 37 is provided with a pair of bearings 40 and 41 between which is mounted a pair of bevel gears 42 and 43. The gear 42 is provided with a long sleeve 44, extending through the bearing 40, and having secured to its outer end, the truck wheel 45. The gear 43 is provided with a long sleeve 46 extending through the bearing 41, and having secured to its outer end the truck wheel 47. The axle 48 passes through the interior of sleeves 44 and 46 and is provided with nuts 49 and washers 50 at its outer ends to secure the wheels 45 and 47 endwise. The wheels 45 and 47 are power operated through the worm wheel 51 secured to the upper end of the shaft 52, which extends downwardly through the trunnion 38, and carries at its lower end, a bevel pinion 53. This bevel pinion 53 engages a bevel gear 54, which is loosely mounted on the sleeve 46. The bevel gear 54 is provided with lugs 55 carrying the pins 56, upon each of which is mounted a bevel pinion 57. These latter engage with bevel gears 42 and 43 and form a well-known form of differential gear.

It is evident from the above description, that when power is applied to the worm wheel 51 in either direction, it will cause a corresponding rotation of the truck wheels 45 and 47; and that if these wheels be describing a curve, the above described differential mechanism will operate to compensate for the various lengths of travel of wheels 45 and 47.

A flange 58 is formed on the turn-table 39, and teeth are formed on this flange, comprising the spur gear 59, which engages with a spur pinion 60 upon the lower end of a shaft 61, the same being supported in suitable bearings and carrying at its upper end a second spur pinion 62, which engages rack teeth 63 on a double-ended plunger 64, mounted in the fluid pressure cylinders 65, these latter being secured to the frame 1. The fluid pressure cylinders 65 are of such a stroke that when the plunger 64 is at one end of its stroke, the truck wheels 45 and 47 will be in the position shown in Figs. 4 and 2; and when the plunger 64 is at the opposite end of its stroke, the axle 48 will be in a position at right angles to the position shown in Fig. 4. By the above means, the front truck wheels 45 and 47 may be steered for the transportation of the machine about the mine, and they may also be readily thrown from a position adapted to cause the machine as a whole to move longitudinally, to a position at right angles to this to enable the machine to be swung laterally.

A motor 66 is mounted on the frame 1, and power is taken from it to operate all the motions of the machine. The front end of the armature shaft 67 carries the spur gear 68, which drives a spur gear 69 mounted upon the shaft 70, the same being supported in the bearings 71 and 72. The shaft 70 carries a worm 73, which meshes with the worm wheel 51, which drives the front truck wheels 45 and 47. The rear end of the armature shaft 67 carries a gear 74, the same meshing with four idler gears 75. The arrangement of these gears is best shown in Fig. 13.

The two upper idler gears 75 engage the drive gears 9 upon the shafts 5, and the two lower idler gears 75 engage the gears 12 on the shafts 11. The idler gears 75 are mounted upon pins 76, the same being secured to a casting 77 fastened to the frame 1. The gears 75 also mesh with and drive a pair of gears 78, mounted upon the shafts 16, which drive the middle cutter bars 3.

The gears 9, 12, 74, 75, and 78 are all substantially in one plane in the present design. The shafts 5 and 11 being inclined to a horizontal position, and the armature shaft 67 being at an angle to the shafts 5 and 11, the gears 74, 75, 9 and 12 should properly be bevel gears with a very acute shaft angle. They may be so made in the present design, and the gears 78 may be spur gears of approximately the form of spur gears, with their teeth mangled somewhat to allow of meshing with the bevel gears 75.

The machine is fed forward as a whole, to start the cutter bars 2, 3, and 4 into the coal by the following mechanism:—The vertical fluid pressure jack 79, provided with upper and lower plungers 80, is mounted upon the rear axle 81, the lower plunger 80 engaging the floor 82, while the upper of the plungers 80 engages the roof 83. A pair of cross channels 84 are secured to the jack cylinder 79, and the ends of these channels are secured to the extension-arms 85, these latter being in telescopic engagement with the frame 1. A pair of feed screws 86 are secured to lugs 87 on the jack 79. These screws 86 extend through threaded sleeves 88, supported in the bearings 89. Spur gears 90 are keyed to the rear ends of sleeves 88, and secured against endwise movement by the nuts 91. The spur gears 90 are driven from the armature shaft 67 by means of the spur pinion 92, through the medium of the idlers 93 mounted upon the pins 94. The spur pinion 92 is connected at will to the armature shaft 67, so as to drive the screws 86. The threads on screws 86 are arranged so that the machine is fed forward when the motor 66 is running in the proper rotating direction to drive the cutter bars 2, 3, and 4, and the screws 86 can be retracted to a position for starting another feeding stroke by reversing the motor 66 when the cutter bars are not in action, as will be described later. The axle 81 is provided with a pair of truck wheels 95, each of these having secured to it a sprocket 96. The idler sprockets 97 and 98 are mounted on brackets secured to the cross beams 84 and the telescopic bars 85. The armature shaft 67 carries at its extreme outer end a worm 99, engaging a worm wheel 100, mounted on the cross shaft 101. This cross shaft 101 is a divided shaft and provided with a differential gear 102, connecting the worm gear 100 with the two members of the shaft 101, in a manner similar to the differential mechanism illustrated for the front truck wheels 45 and 47. Each end of the shaft 101 is provided with a driving sprocket 103. A pair of idler sprockets 104 are mounted in take-up frames 105 secured to the frame 1. Another pair of idler sprockets 106 are secured to the telescopic bars 85, and a chain 107 is passed around the sprockets 103, 104, 106, 96, 97, and 98, as plainly shown in Fig. 2.

It will be observed that the sprockets 103 and 104 are fastened to the main frame 1, and that the other four sprockets are fastened to the telescopic members 85. It will be evident that the above arrangement provides a flexible drive, permitting the driving sprockets 103 to transmit power to the sprockets 96 of the rear truck wheels, 95, in any relative position of the rear truck wheels 95 to the frame 1.

From the above description, and from the previous description of the drive of the front truck wheels, it will be seen that we have provided power driven mechanism actuating all the truck wheels, and have also provided power actuated steering mechanism for steering the front truck wheels.

The worm 99 may be connected at will to the armature shaft 67 by a clutch 108, so that the rear truck wheels may be driven independently of, or simultaneously with, the front truck wheels. At the forward end of the machine there is provided a pair of jack cylinders 109, these being pivoted about the pin 110, which latter is secured to the frame 1.

The detail construction of the jack cylinders 109 is illustrated in Fig. 7. The plunger 111 enters the cylinder 109 through the stuffing box 112. The plunger 111 is provided at its rear end with the piston 113, having the packing rings 114. The front end of the plunger 111 contains a pointed member 115. Owing to the small space available between the side of the frame 1, and the side of the cut 116, it is necessary to provide extensions of the plunger 111, which may be successively applied thereto to swing the front end of the machine across the cut being made. The extensions consist of a piece of pipe 117 of considerable length, having the open rear end, which is adapted to slip over the pointed member 115. The point of the pipe extensions is provided with a second point 118 adapted to engage the side of the cut. The plungers 111 extend through slots 119 in the sides of frame 1.

In Fig. 5, we have shown the detail construction of cutter bars 2 and 4. The cutter bar consists of a piece of forged or cast steel 120, around the outside of which is formed the double screw thread 121. Tapered holes 122 are formed in the screw thread 121, and cutting points or bits 123 and 124 are driven tightly into the tapered holes 122. The tapered holes 122 are exact duplicates throughout the bar, but the cutting points 123 and 124 are slightly different, being of greater projection at the larger end of the bar, as shown at 123, and gradually reducing in length from the larger to the smaller end of the bar, until they reach the least projection as shown at 124. The purpose of this arrangement is to allow the bits 123 to be reground or redressed when worn, and to be moved gradually further down the bar when reinserted therein to allow for wear.

The helical mounting of the bits together with the thread cut on the bar forms a helical conveyer, which is adapted to rapidly withdraw the cuttings as fast as made and insure a free cutting action of the teeth.

Fig. 5 illustrates the detail construction of cutter bars 2 and 4. The construction of cutter bar 3 is quite similar, the only difference being in the degree of taper in the bar. All the cutter bars are adapted to be fed endwise into the coal in starting a cut, and to provide for this action, the front end of the bar is fitted with a cap 125 having the lips 126 similar to those on an ordinary flat drill, and being also provided with the side cutting or milling edge, 127. The cap 125 is screwed onto the end of the bar 120 by a tapered thread 128. The bar as a whole is secured to its driving shaft by a similar tapered thread 129. The driving shafts 5, 11, and 16 are provided with a central hole 140, connecting with the hole 141, which reaches from the outside of the shaft to the hole 140. Compressed air may be supplied to the hole 141 by means of a suitable annular sleeve surrounding the shafts 5, 11, and 16. This air will pass to the front end of the cutter bar through the holes 130 and 131 to the small holes 133. A space 132 is left between the end of the bar 120, and the interior end of the cap 125, and the air after passing through hole 131 enters this space 132 and is conducted thence to the front end of the cap 125 by a pair of small holes 133. The projection of the cutter bars into the coal will usually be from five to six feet and the design of cutter bar illustrated in Fig. 5 is well adapted to sustain the load on the bar, which is similar to that of a cantaliver beam. In addition to this, the torque of the bar increases regularly from front to rear.

A further and most important advantage in the tapered form of bar consists in the fact that when mounted on the inclined shaft, such as 5 or 11, the taper of the bar and the inclination of the shaft can be so proportioned relatively that the cut made by the bar will be parallel to the length of the machine, and that as the machine is advanced the bars will operate to cut a plane, leaving no ridges or undulations to be encountered by the truck wheels.

A further advantage obtained by making the cutter bars detachable from their shaft is that each bar may be separately handled by two men, and a full set of bars may be readily handled on a truck. The bars being readily detachable when the cutters become worn, the whole bar is removed and replaced by a duplicate in a few minutes, instead of it being necessary to separately remove and replace each cutter, of which there will be upward of 100 in each bar.

A further advantage in this detachable feature consists in the fact that the cutter bars may be conveniently transported to a favorable place for resharpening, and the form and dimensions of the bar are such that if desired, a special machine of simple character may be employed to grind the cutters, without taking them from the bar. In Figs. 8, 9, 10, 11, and 12, we have shown a variety of combinations of cuts, which may be made by our improved machine.

In all the above figures, the upper cut 134 is made by the upper cutter bars 2. Lower cut 135 is made by the lower cutter bars 4, and the middle cut 136 is made by the middle cutter bars 3. The vertical cuts 137 are also made by the middle cutter bars 3, when the same are oscillated as herein before described.

The preferred combination of cuts for a room or entry is that shown in Fig. 12, in which there are three horizontal and four vertical cuts. It is obvious, however, that by the omission of the middle cutter bars 3 the machine is equally well adapted to make the combination of cuts shown in Fig. 8, and by the omission of cutter bars 2, to make the combination of cut shown in Fig. 9.

The coal lying between the cuts 134 and 135 in Fig. 8 would have to be broken up considerably, in order to load it out of the mine, as the lumps shown between these cuts are too large to be handled. The same statement is true with reference to the lumps above and below cut 136 in Fig. 9, and in addition to this, the lump above cut 136 would have to be wedged down.

The combination of cuts shown in Fig. 10 is made by merely omitting to use the vertical oscillating movement of cutter bars 3. and the combination of cuts shown in Fig. 11, dispenses with two of these. Any of the five combinations of cuts shown are applicable for mining purposes, and our improved machine could be advantageously used comparatively to present practice to make any of them. However, in an entry, the usual width of which is from 8 to 12 feet, the most convenient sub-division of the coal is made by the combination of cuts shown in Fig. 12; and for a wider entry or room, a similar arrangement of cuts would be proper, making the sub-division between the vertical cuts about as shown in Fig. 12.

A small air pump, 137 is mounted on the frame 1, at the forward end of the motor 66, and may be driven from the motor shaft 67 by any convenient driving means. The pump 137 is adapted to compress air into the reservoir 138, from which it may be led to operate the various fluid pressure cylinders above described. As the operation of these cylinders is intermittent, a small pump running constantly will supply sufficient air, provided the reservoir capacity is of sufficient size.

The operation of our improved machine is as follows:—The machine is brought to a position with the ends 126 of the cutter bars adjacent to the face of the coal, with the jack cylinder 79 at its inner position, i. e., close to the rear end of the frame 1. Fluid pressure is then applied to clamp the jack 79. The motor 66 is then started in the proper direction to drive the cutter bars, and the clutch 108 is thrown in to supply power to the screws 86. The cutter bars are thus forced slowly into the coal until they are fully engaged as shown in Figs. 1 and 2. When the cutter bars have reached the full depth of cut, fluid pressure is applied to the outer ends of locking cylinder 29 to release and hold out of engagement the locking plungers 30. Fluid pressure is then applied to cylinder 27 to oscillate the cutter bars 3 vertically downward, which make the left hand pair of cuts 37 as shown in Fig. 12. When the bearing 14 has reached its last position, as determined by the lower end of the slot 19, the fluid pressure is released from cylinder 27 and applied to cylinder 28, which brings the cutter bars 3 up to their normal level position, and starts them to make an upward vertical cut. At the expiration of this cut, fluid pressure is released from cylinder 28, allowing the cutter bars 3 to drop to their normal level position, or the fluid pressure may be retained to cylinder 28 and applied to cylinder 27, which will produce the same result on account of the balanced action of the cylinders. Fluid pressure is then applied to cylinder 29 to throw in the locking device, and is also applied to the left hand jack 109 to cause the front end of the machine to swing toward the right. At the same time fluid pressure is admitted to one of the cylinders 65 to place the front truck wheels 45 and 47 in position to swing across the entry. This swinging motion is continued until the machine has traversed the full width of the entry, at which time the fluid pressure is released from jack 109, the front truck wheels are swung back to their original position as shown in Fig. 4. the locking plungers 30 are released, and fluid pressure is applied to the cylinders 27 to make vertical cuts as before, after which it is again applied to the cylinders 28 to finish these vertical cuts. At the expiration of this process, the combination of cuts shown in Fig. 12 is complete, the cutter bars 3 are returned to their normal level position, and the machine is backed for some little distance down the entry or room by applying the power of the motor 66 to drive the truck wheels.

In the claims, all words "cutter bar" or "rotary cutter bar" are intended to mean a bar adapted to be fed sidewise through the coal, in a direction perpendicular to its axis in rotation, and adapted to cut a slot therein, as distinguished from a drill which is fed endwise into the coal to cut a circular hole.

The lumps of coal hanging as shown in Fig. 12 may be readily broken down by any desired mechanism, such as a crow-bar, and are then ready for removal.

The above description covers the preferred method of operating our improved machine, and it is obvious that it might be operated in many other ways. It is further obvious that the various mechanisms and arrangements of parts may be varied within wide limits by those skilled in the art of designing and constructing such machines, without departing from the spirit of our invention, as covered by the following claims.

We claim—

1. In a mining machine, a frame, three rotary cutter bars mounted thereon, one above the other, and arranged to make simultaneously an undercut, an overcut, and an intermediate cut between the undercut and the overcut, the axes of said upper and lower cutter bars being inclined to the horizontal in opposite directions.

2. In a mining machine, a frame, a plurality of rotary cutter bars carried thereby and arranged to make simultaneously three substantially horizontal cuts in the coal at different levels, said middle cut having parallel sides, said upper and lower cuts being wedge shaped and the upper side of the upper cut being parallel to the lower side of the lower cut.

3. In a mining machine, a frame, a rotary cutter bar rigidly mounted thereon, means for swinging the frame to cause said cutter bar to cut a horizontal slot in the coal, a second rotary cutter bar pivotally connected to said frame so as to swing in a vertical arc, and means for swinging said second cutter bar vertically to cut a vertical slot when the frame is stationary.

4. In a mining machine, a frame, a rotary cutter bar rigidly mounted thereon, means for swinging the frame to cause said cutter bar to make an undercut, a second cutter bar similarly mounted arranged to make an overcut when the frame is swung, and a third cutter bar pivotally mounted on said frame between said first two bars, which may make either a horizontal cut between said undercut and said overcut when the frame is swung, or a vertical cut when the bar is oscillated with respect to the frame, and means for oscillating said third cutter bar in a vertical plane.

5. In a mining machine, a frame, six rotary cutter bars carried thereby, driving means therefor, means for simultaneously advancing all of said cutter bars endwise into the coal, means for traversing all of said bars sidewise to make horizontal cuts, and means for traversing two of said bars vertically to make vertical cuts.

6. In a mining machine, a frame, a plurality of rotary cutter bars carried thereby, driving means therefor, means for simultaneously advancing all of said bars endwise into the coal, means for traversing certain of said bars sidewise to make horizontal cuts, and means for traversing certain other of said bars in another direction to make cuts at an angle to said first mentioned cuts.

7. In a mining machine, a frame, a motor mounted thereon, cutting elements carried by said frame, and driven by said motor, front and rear wheels supporting said frame, driving connections between said motor and all of said wheels to feed the cutting elements into the coal, power actuated means for steering said front wheels to allow of said cutting elements being swung sidewise to make their cuts, and means for swinging the frame.

8. In a mining machine, a tapered rotary cutter bar, a number of inserted cutters on the outer surface of the same, and duplicated seats for said cutters, said cutters increasing regularly in length from the small end to the large end of said bar.

9. In a mining machine, a tapered rotary cutter bar adapted to cut a wedge shaped slot in the coal, and a series of inserted cutters of graded length adapted to be arranged on the bar when worn, to preserve the original size of the slot cut.

10. In a mining machine, a frame, having a vertical ground engaging pivot at the rear end thereof, a rotary cutter bar mounted for oscillation in a vertical plane to the front of said frame, means for driving said cutter bar, means for oscillating it to make a vertical cut, and means for swinging the machine about its pivot to make a horizontal cut.

11. In a mining machine, a main frame, a supplementary frame rearwardly extensible from said main frame, clamping and pivoting means carried by said supplementary frame, mechanism for controlling the extension of said supplementary frame, and mechanism for swinging said frames about said pivot.

12. In a mining machine, a main frame, a supplementary frame rearwardly extensible from said main frame, a combined clamp and pivot secured to said supplementary frame, a motor, mechanism driven by said motor for controlling the extension of said supplementary frame, and mechanism also driven by said motor for swinging said frames about said pivot.

13. In a mining machine, a main frame, a supplementary frame rearwardly extensible from the main frame, a combined clamp and pivot secured to said supplementary frame, a pair of interconnected power driven threaded members controlling the extension of said supplementary frame, and means for swinging said frames about said pivot.

14. In a mining machine, a main frame, a motor thereon, a shaft mounted on said frame and driven by said motor, a driving sprocket secured to said shaft, a supplementary frame extensible from said main frame, a truck wheel secured thereto, a driven sprocket connected to said truck wheel, idler sprockets mounted on said supplementary frame, and an endless chain engaging said sprockets and arranged to transmit power from the driving to the driven sprocket to propel the machine.

15. In a mining machine, a frame, cutting devices mounted at the front end thereof, front and rear wheels supporting said frame, means for driving all of said wheels to feed the cutting devices into the coal, means for steering the front wheels to allow said frame and said cutting devices to be swung sidewise to make their cuts, and means for swinging the frame.

16. In a mining machine, a frame, power actuated cutting devices, arranged to make a vertical cut and a horizontal cut in the coal, supported at the front end thereof, wheels in supporting relation to said frame, means for driving said wheels to feed the cutting devices into the coal, means for steering said wheels to allow said cutting devices to swing sidewise, and means to swing the frame.

17. In a mining machine, a frame, means to make a horizontal cut near the floor, means to feed two cutter bars endwise into the coal near the roof, power actuated means to lower the cutter bars through the coal thereby severing the coal at the bottom and on two sides, power actuated means to withdraw the machine and power actuated means to move it sidewise to position it for a new cut.

HARRY A. KUHN.
WALTER W. MACFARREN.

Witnesses:
ESTELLE M. JOHNSON,
CHAS. FOXTERMAN.